US007321903B2

(12) United States Patent
Handy-Bosma et al.

(10) Patent No.: US 7,321,903 B2
(45) Date of Patent: *Jan. 22, 2008

(54) METHOD FOR UNIFIED COLLECTION OF CONTENT ANALYTIC DATA

(75) Inventors: John Hans Handy-Bosma, Cedar Park, TX (US); Kevin Holubar, Cedar Park, TX (US); Shannon James Kerlick, Cedar Park, TX (US); Dan Jeffrey Mandelstein, Austin, TX (US); Arvind Raveendranathan Nair, Bangalore (IN); Mei Yang Selvage, Austin, TX (US); Thomas Christopher Storey, Wappingers Falls, NY (US); Sudhandhira Selvan Viswanathan, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 540 days.

This patent is subject to a terminal disclaimer.

(21) Appl. No.: 10/840,563

(22) Filed: May 6, 2004

(65) Prior Publication Data
US 2005/0251530 A1 Nov. 10, 2005

(51) Int. Cl.
G06F 17/00 (2006.01)
G06F 17/30 (2006.01)
(52) U.S. Cl. ................. 707/104.1; 707/3
(58) Field of Classification Search .......... 707/1–10, 707/100–104.1, 200–205; 705/1–100
See application file for complete search history.

(56) References Cited
U.S. PATENT DOCUMENTS

| | | | |
|---|---|---|---|
| 5,471,677 A | 11/1995 | Imanaka | 395/600 |
| 5,940,471 A | 8/1999 | Homayoun | 379/1 |
| 6,029,195 A * | 2/2000 | Herz | 725/116 |
| 6,064,971 A | 5/2000 | Harnett | 705/7 |
| 6,505,168 B1 | 1/2003 | Rothman et al. | 705/10 |
| 6,510,427 B1 | 1/2003 | Bossemeyer, Jr. et al. | 707/6 |
| 6,567,796 B1 | 5/2003 | Yost et al. | 707/2 |
| 6,904,408 B1 * | 6/2005 | McCarthy et al. | 705/2 |
| 2002/0184082 A1 | 12/2002 | Nakano et al. | 705/10 |
| 2003/0130945 A1 | 7/2003 | Force et al. | 705/40 |
| 2003/0187719 A1 | 10/2003 | Brocklebank | 705/10 |
| 2004/0064351 A1 * | 4/2004 | Mikurak | 705/7 |
| 2005/0144158 A1 * | 6/2005 | Capper et al. | 707/3 |
| 2005/0288954 A1 * | 12/2005 | McCarthy et al. | 705/1 |

* cited by examiner

Primary Examiner—Hosain Alam
Assistant Examiner—Navneet K Ahluwalia
(74) Attorney, Agent, or Firm—David A. Mims, Jr.; Rudolf O. Siegesmund; Gordon & Rees, LLP

(57) ABSTRACT

A method for storing a user evaluation of distributed content comprising an Evaluation Program (EP) that creates a user session when a user accesses distributed content. The user evaluation is saved with other information such as the time and date of the evaluation, the user's personal information, and the navigation path the user used to access the distributed content page. The EP records the user's navigation of the distributed content in the user session. The EP gives the user the opportunity to rate distributed content. The EP saves the user's evaluation with the user session data and external stimuli data. The EP closes the user session when the user leaves the distributed content. The EP reopens the user session when the user returns to the distributed content.

20 Claims, 4 Drawing Sheets

140

C:\$data\patent\Rubix\DDL\ratings.htm—Microsoft In...

142 — Did the information help you to achieve your goal?
- ○ Yes
- ○ No    } 144
- ○ Don't Know 142 — How useful is the information? (1-5 rating)
1=Not at all useful  5=extremely useful
○ 1  ○ 2  ○ 3  ○ 4  ○ 5  } 144

142 — What best describes your job function (title)?

Chief Executive/CTO
Executive Reporting to Chief Executive
Business Executive
Senior Level Management
Technical or Professional
Not Employed
Other
Prefer not to answer

144

Comments

Enter your comments here

146

Submit

*FIG. 4*

USER ID: 42086712 — 202

USER IP ADDRESS: 192.142.64.2 — 204

| DISTRIBUTED CONTENT PAGE 206 | DISTRIBUTED CONTENT PAGE VERSION 208 | ACCESSED VIA 210 | DATE/ TIME 212 | DURATION 214 | EXITED VIA 216 | USER RATING 218 | CONTENT RATING WINDOW VERSION 220 | SESSION ID 222 | MEDIUM 224 | TACTIC ID 226 |
|---|---|---|---|---|---|---|---|---|---|---|
| www.home.com | 2.31 | OPENED BROWSER-HOME WEBPAGE | 2/2/2004, 16:02:26 CST | 00:03:42 | CLICKED HYPERLINK | N/A | N/A | 0001 | WEBPAGE | 1554 |
| www.home.com /page2.htm | 1.33 | www.home.com HYPERLINK | 2/2/2004, 16:04:08 CST | 00:01:16 | CLICKED HYPERLINK | YES | 1.01 | 0001 | WEBPAGE | 1556 |
| www.home.com /page3.htm | 1.04 | www.home.com /page2.htm HYPERLINK | 2/2/2004, 16:05:24 CST | 00:02:31 | CLOSED BROWSER | NO | 1.03 | 0001 | WEBPAGE | 1527 |
| www.home.com | 1.34 | OPENED BROWSER-HOME WEBPAGE | 2/4/2004, 12:11:03 CST | 00:03:05 | ENTERED NEW URL | N/A | N/A | 0002 | WEBPAGE | 1524 |
| www.home.com /page2.htm | 1.34 | ENTERED URL | 2/4/2004, 12:14:08 CST | 00:01:18 | CLICKED HYPERLINK | YES | 1.01 | 0002 | WEBPAGE | 1536 |
| www.home.com /page3.htm | 1.04 | www.home.com /page2.htm HYPERLINK | 2/4/2004, 12:15:26 CST | 00:02:31 | CLOSED BROWSER | YES | 1.03 | 0002 | WEBPAGE | 1602 |

METHOD FOR UNIFIED COLLECTION OF CONTENT ANALYTIC DATA

CROSS-REFERENCE TO RELATED APPLICATION

The present invention is related to the subject matter of U.S. patent application Ser. No. 10/798,903, incorporated herein by reference.

FIELD OF THE INVENTION

The present invention is directed generally to a method for storing distributed content evaluations and specifically to a method for storing a user's real-time evaluation of distributed content pages in a data repository.

BACKGROUND OF THE INVENTION

Distributed content is a general term used to describe electronic media that is distributed to end users. Examples of distributed content include webpages, websites, dynamically generated content, cellular telephones using wireless application protocol (WAP) to serve content on the cellular telephone screen, and so forth. Other examples of distributed content are known to persons of ordinary skill in the art. Because there is a high demand for adapting distributed content to the end users' needs, distributed content administrators (administrators) need high-quality feedback on the distributed content pages they administer. Due to the anonymity of distributed content users (users), reliable user feedback regarding the distributed content pages can be difficult to obtain.

One of the problems associated with obtaining user evaluations of distributed content is that users do not give consistent feedback. Often, a user will only give feedback when the user has had a particularly difficult time navigating the distributed content. While these types of comments are useful to administrators in removing distributed content that is difficult to use, such comments do not convey information regarding other distributed content end users have viewed. Therefore, a need exists for a method for a user to obtain user evaluations of all of the administered distributed content.

A second problem associated with user evaluation of distributed content is that the user is sometimes presented with a single user evaluation form or survey to use in evaluating a plurality of distributed content pages. When a user evaluates a plurality of distributed content pages on a single survey, the user tends to remember more information about the most recently navigated pages and less information about the first pages. Thus, the survey does not adequately represent the user's evaluation of the entire distributed content, but rather the user's evaluation of the distributed content pages immediately preceding the survey. A survey that weighs the user's evaluation of more recently navigated content is called a back-loaded survey. Back-loaded surveys are not preferable because they do not adequately reflect the user's qualitative experience of the entire distributed content. Therefore, a need exists for a method of capturing a user's evaluation of distributed content in which the user's evaluation evenly reflects the user's experience in navigation of the entire set of distributed content.

A third problem associated with user evaluation of distributed content is that the survey is sometimes presented before the user has completed his navigation of the distributed content. When the survey is placed at the end of the user's navigation of the distributed content (i.e. after user selection of service, payment, and receipt of the confirmation number), users frequently do not complete the survey. Rather than complete the survey, the majority of users choose to close the distributed content application. In order to increase the number of completed surveys, administrators position the survey so that it appears before the user has completed his navigation of the distributed content (i.e. after user selection of services but prior to payment). When a survey is completed prior to conclusion of the user navigation of the distributed content, the evaluation is said to be front-loaded. Front-loaded evaluations are not preferable because they do not capture a complete picture of the user's evaluation of the distributed content. Therefore, a need exists for a method of capturing a user's evaluation of distributed content after the user has completed his navigation of the distributed content.

In addition to the disadvantages discussed above, surveys also have another disadvantage: the survey is a standard document applied to a wide variety of distributed content users. In other words, the surveys cannot be configured for specific users in the United States, Mexico, Asia, or Europe. The prior art surveys also cannot differentiate users who view one version or type of the distributed content from users who view another version or type of distributed content. If a survey were able to differentiate between different types of users and the distributed content they view or use, then the survey could be customized for each type of user. Customizing the survey to each type of user would make the responses in the survey more meaningful. Therefore, a need exists for a method for surveying distributed content users in which the survey can be configured according to the characteristics and navigation experiences of individual users or groups of users.

In addition to the disadvantages associated with surveys, it is preferable to track the external stimuli presented to the user. External stimuli are data useful to distributed content administrators, but not directly related to the user's evaluation of the distributed content. One example of an external stimulus is the medium by which the user accessed the distributed content. Possible medium sources include the World Wide Web, email, telephone, television, and so forth. Another example of an external stimulus is the tactic used to contact or market to the user. Persons of ordinary skill in the art have developed a technique for tracking marketing tactics by assigning a unique ID to each message provided to a user. The ability to store the external stimuli data with the user survey would make the user surveys more meaningful to distributed content administrators. Therefore, a need exists for a method for surveying distributed content in which the external stimuli presented to the user is captured in conjunction with the user evaluation.

Consequently, a need exists in the art for an improved method for user evaluation of distributed content. A need exists for a method in which the user can identify the distributed content that is difficult to use and distributed content that is easy to use. A need exists for a method of capturing a user's evaluation of distributed content in which the user's evaluation evenly reflects the user's experience in navigation of the entire distributed content. A need exists for a method of capturing a user's evaluation of distributed content after the user has completed his navigation of the distributed content. A need extends to a method for surveying distributed content users in which the survey can be configured for individual users. Finally, a need exists for a method for surveying distributed content in which the external stimuli presented to the user is captured in conjunction with the user evaluation.

SUMMARY OF THE INVENTION

The present invention, which meets the needs identified above, is a data repository for storing a user evaluation of distributed content. The user evaluation is saved with other information such as the time and date of the evaluation, the user's personal information, and the navigation path the user used to access the distributed content page. The software embodiment of the present invention comprises an Evaluation Program (EP) that creates a user session when a user accesses distributed content. The EP records the user's navigation of the distributed content in the user session. The EP gives the user the opportunity to rate distributed content if the distributed content page has a content rating window. The user also has the option to forgo rating the distributed content page, if desired. If the user decides to rate the distributed content page, the EP displays a content rating window that allows the user to rate the distributed content page. The EP saves the user's evaluation with the user session data and external stimuli data. If the user accesses another distributed content page, the EP repeats the process described above. The EP closes the user session when the user leaves the distributed content. The EP reopens the user session when the user returns to the distributed content.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 4 is an illustration of the content rating window of the present invention; and FIG. 5 is an illustration of the data repository of the present invention.

DETAILED DESCRIPTION OF THE PREFERRED EMBODIMENT

As used herein, the term "computer" shall mean a machine having a processor, a memory, and an operating system, capable of interaction with a user or other computer, and shall include without limitation desktop computers, notebook computers, tablet computers, personal digital assistants (PDAs), servers, handheld computers, and similar devices.

As used herein, the term "content rating window" shall mean a graphical user interface (GUI) that allows a user to rate a distributed content page.

As used herein, the term "distributed content" shall mean electronic content distributed to a plurality of end users over a computer network. Examples of distributed content include webpages and websites, dynamically generated content, and cellular telephones using wireless application protocol (WAP) to serve content on the cellular telephone screen. Other examples of distributed content are known to persons of ordinary skill in the art.

As used herein, the term "distributed content page" shall mean a single distributed content document, file, script, view of content, or database.

As used herein, the term "evaluate" shall mean for a user to rate the distributed content page.

As used herein, the term "external stimuli" shall mean data regarding the user's access of the distributed content that is not directly related to the user's evaluation of the distributed content.

As used herein, the term "medium" shall mean the mechanism by which a user the distributed content. Possible medium sources include the World Wide Web, email, telephone, and television.

As used herein, the term "navigation" shall mean to browse, select options from, and/or click hyperlinks on a distributed content page.

As used herein, the term "tactic" shall mean a device or mechanism used to contact or market to a user.

As used herein, the term "user ratings" shall mean a database containing a user evaluation of a distributed content page, the version of the distributed content page, and external stimuli.

As used herein, the term "user session" shall mean a database of the user information and the user's navigation history through a distributed content page.

Figure 1:
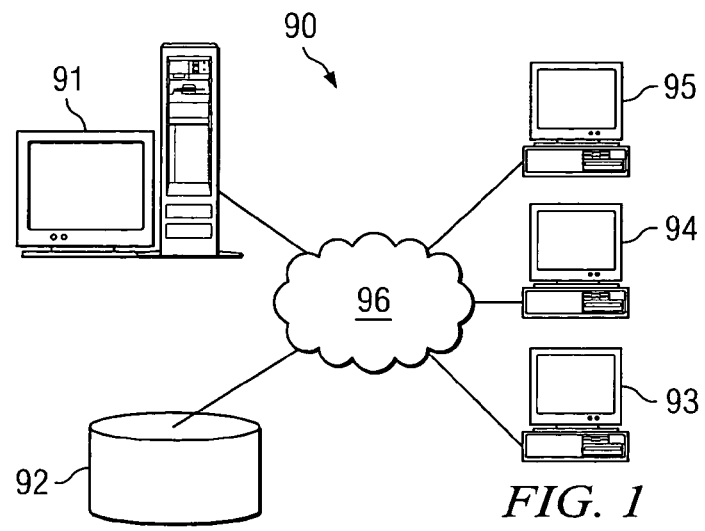
FIG. 1 is an illustration of a computer network used to implement the present invention.

FIG. 1 is an illustration of computer network 90 associated with the present invention. Computer network 90 comprises local computer 95 electrically coupled to network 96. Local computer 95 is electrically coupled to remote computer 94 and remote computer 93 via network 96. Local computer 95 is also electrically coupled to server 91 and database 92 via network 96. Network 96 may be a simplified network connection such as a local area network (LAN) or may be a larger network such as a wide area network (WAN) or the Internet. Furthermore, computer network 90 depicted in FIG. 1 is intended as a representation of a possible operating network containing the present invention and is not meant as an architectural limitation.

Figure 2:
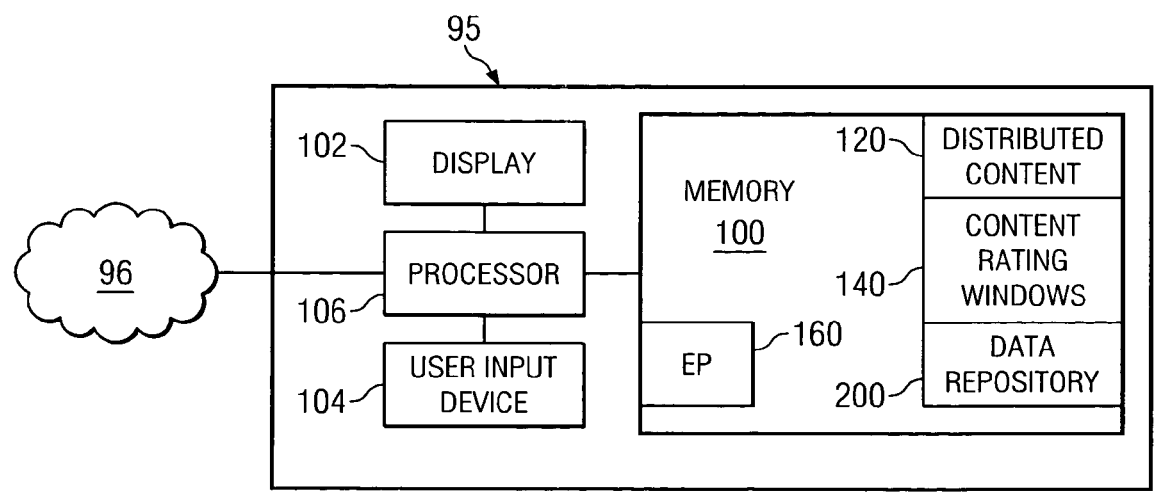
FIG. 2 is an illustration of a computer, including a memory and a processor, associated with the present invention.

The internal configuration of a computer, including connection and orientation of the processor, memory, and input/output devices, is well known in the art. The present invention may be a method, a stand alone computer program, or a plug-in to an existing computer program. Persons of ordinary skill in the art are aware of how to configure computer programs, such as those described herein, to plug into an existing computer program. Referring to FIG. 2, the methodology of the present invention is implemented on software by Evaluation Program (EP) 160. EP 160 described herein can be stored within the memory of any computer depicted in FIG. 1. Alternatively, EP 160 can be stored in an external storage device such as a removable disk, a CD-ROM, or a USB storage device. Memory 100 is illustrative of the memory within one of the computers of FIG. 1. Memory 100 also contains distributed content 120, content rating windows 140, and data repository 200.

Distributed content 120 is electronic content distributed to a plurality of end users over a computer network. Distributed content 120 comprises a plurality of distributed content pages. Examples of distributed content include webpages, websites, dynamically generated content, and cellular telephones using wireless application protocol (WAP) to serve content on the cellular telephone screen. Other examples of distributed content are known to persons of ordinary skill in the art. Distributed content 120 contains at least one distributed content page accessible by a user. Content ratings windows 140 are windows that allow the users to rate the distributed content pages. Data repository 200 stores the user session data for the user, the user evaluations of the distributed content, and the external stimuli data. Data repository 200 includes the user's personal information (i.e. if the user is male/female, the user's physical location, and so forth), the access time, the access date, the user's IP address, the selected incentive plan, and whether the user accesses the Internet via a computer, PDA, or cellular telephone. Data repository 200 also includes user information such as the user's purchase history and membership information. If desired, all or part of the user's information can be redacted prior to analysis by a distributed content administrator so that the user's privacy can be preserved. The present invention may interface with distributed content 120, content rating windows 140, and data repository 200 through memory 100.

As part of the present invention, the memory 100 can be configured with EP 160, distributed content 120, content rating windows 140, and/or data repository 200. Processor 106 can execute the instructions contained in EP 160. Processor 106 is also able to display data on display 102 and accept user input on user input device 104. Processor 106, user input device 104, display 102, and memory 100 are part of a computer such as local computer 95 in FIG. 1. Processor 106 can communicate with other computers via network 96.

In alternative embodiments, EP 160, distributed content 120, content rating windows 140, and/or data repository 200 can be stored in the memory of other computers. Storing EP 160, distributed content 120, content rating windows 140, and/or data repository 200 in the memory of other computers allows the processor workload to be distributed across a plurality of processors instead of a single processor. Further configurations of EP 160, distributed content 120, content rating windows 140, and/or data repository 200 across various memories, such as client memory and server memory, are known by persons of ordinary skill in the art.

Figure 3:
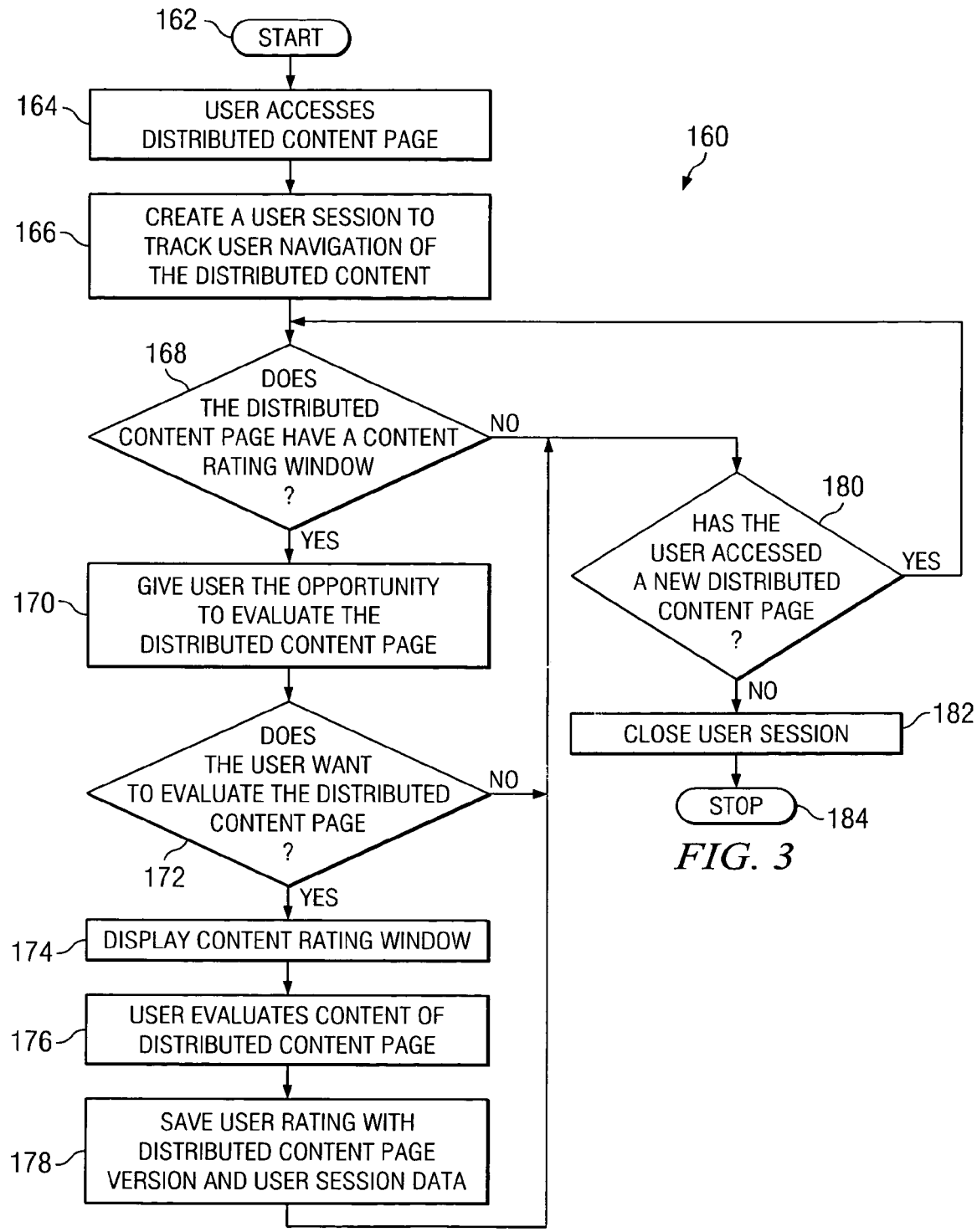
FIG. 3 is an illustration of the logic of the Evaluation Program (EP) of the present invention.

FIG. 3 is an illustration of the logic of Evaluation Program (EP) 160 of the present invention. EP 160 is a computer software program that allows a user to evaluate a plurality of distributed content pages as the user completes his navigation of each distributed content page. EP 160 starts whenever the distributed content administrator invokes EP 160 (162). A user then accesses a distributed content page (164). The distributed content page may be like one of the distributed content pages in distributed content 120 depicted in FIG. 2. EP 160 creates a user session to track the user's navigation of the distributed content pages (166). The user session may be stored in data repository 200 depicted in FIG. 2. EP 160 then determines whether a content rating window has been created for the distributed content page (168). The content rating window may be like content rating window 140 depicted in FIG. 2. If the distributed content page does not have a content rating window, EP 160 proceeds to step 180. If the distributed content page has a content rating window, then EP 160 gives the user an opportunity to evaluate the content of the present distributed content page (170). EP 160 can give the user the opportunity to rate the distributed content page by displaying a button that launches a content rating window. Alternatively, EP 160 can display the content rating window as a pop-up window or as a window adjacent to the distributed content page. Displaying the content rating window as a pop-up window or as an adjacent window allows the user to review the distributed content page while completing the evaluation form on the content rating window.

EP 160 then makes a determination whether the user wants to rate the distributed content page (172). The user can indicate that he wants to rate the distributed content page by clicking the button to launch the content rating window or by rating the distributed content page on the content rating window. The user can indicate that he does not want to rate the distributed content page by not clicking the button to launch the content rating window or by closing the content rating window without evaluating the content. If the user does not want to rate the distributed content page, EP 160 proceeds to step 180. If the user wants to rate the distributed content page, then EP 160 displays the content rating window, if not already displayed (174). The present invention does not need to display the content rating window if the content rating window was displayed as part of step 170. The user then rates the present distributed content page (176). In evaluating the distributed content page, the user completes a user rating file by answering a plurality of questions regarding the distributed content page. The user has the option of entering a message in the comments area of the content rating window. If desired, the user can save the user rating file in memory and access the user rating file at a later date. The user can complete his user rating file via email, web browser, telephone, or any other communicative means. Persons of ordinary skill in the art are aware of how to access a computer file, such as a user rating file, via email, web browser, telephone, and other communicative means. EP 160 then saves the user rating file with a copy of the distributed content page and the user session data (178). EP 160 then proceeds to step 180.

At step 180, EP 160 then determines whether the user has accessed a new distributed content page (180). If the user has accessed a new distributed content page, then EP 160 returns to step 168. If the user has not accessed a new distributed content page, then EP 160 closes the user session and saves the user session in the user sessions file (182). EP 160 then ends (184). When the user returns to the distributed content, EP 160 reopens the user session and continues to track the user's access throughout the distributed content. Alternately, a user may close a session and resume a second session. Because sessions are tracked to unique users, an end user is capable of providing ratings of distributed content on a per-session basis, or the user may rate some or all content viewed across multiple sessions. Maintaining user sessions for a single user allows the present invention to develop a more accurate history of a specific user's navigation through the distributed content.

FIG. 4 is an illustration of one embodiment of content rating window 140. Content rating window 140 allows the user to rate distributed content while the user is navigating the distributed content page. Content rating window 140 asks the user a series of questions 142. The user enters the answers 144 to the questions 142. The user may also enter comments 146, if desired. The user may submit the evaluation using the "Submit" button.

FIG. 5 is an illustration of one embodiment of data repository 200. Data repository 200 comprises user ID 202, user IP address 204, distributed content page 206, distributed content page version 208, accessed via 210, time/date 212, duration 214, exited via 216, user rating 218, content rating window version 220, session ID 222, medium 224, and tactic ID 226. User ID 202 identifies the specific user and may optionally reference the user's personal information if such information is stored in a database associated with the present invention. The user's personal information may be redacted, if desired. User IP address 204 identifies the IP address for the user. Distributed content page 206 is the distributed content page that the user accessed. Distributed content page version 208 is the version of distributed content page 206. Accessed via 210 is the path by which the user accessed distributed content page 206. Time/date 212 is the time and date that the user accessed distributed content page 206. Duration 214 is the total time the user spent browsing distributed content page 206. Exited via 216 is the path by which the user exited distributed content page 206. User rating 218 is a Boolean field that defines whether the user completed a user rating for distributed content page 206. Content rating window version 220 is the version of the content rating window 140 that the user viewed to evaluate distributed content 206. Session ID 222 is the identification number for the user's navigational session of distributed content. When the user opens an application or logs on after a previous session, the present invention creates a new session ID. Medium 224 is the distributed content medium by which the user accessed the distributed content. Tactic ID 226 is the unique number that identifies the message(s) sent to the user. Medium 224 and tactic ID 226 are examples of external stimuli. Persons of ordinary skill in the art are aware of other types of external stimuli that can be added to data repository 200.

The configuration of EP 160, distributed content 120, content rating windows 140, and data repository 200 of the present invention offer many advantages over the prior art solutions. For example, because the user ratings are saved in conjunction with specific information about the user in data repository 200 may be categorized by any of the fields in data repository 200. The present invention also resolves the problem of front-loaded and back-loaded evaluations by gathering information within the context of a complete visit to the distributed content page by the user. The present invention provides the user with an opportunity to evaluate a plurality of distributed content pages within a plurality of different types of distributed content. Through the incentive program, the present invention encourages user evaluation of the distributed content pages. The users are able to refresh their memory about the distributed content page by flipping back and forth between the distributed content page and content rating window 140 while evaluating the distributed content page.

The present invention is also extensible. The invention allows the administrators to analyze the duration data in data repository 200 to differentiate between distributed content page requests created by stray mouse clicks (or other pointing device) and deliberate distributed content page requests. The present invention allows the user to launch and re-launch content rating window 140 when desired. The present invention can be configured to allow a user to update his evaluation by reopening his user rating. The user can then complete his users rating via email, web browser, telephone, or any other communicative means. The present invention allows for integration of a company's complaint management, support, and similar systems. Finally, the present invention can be cross-referenced with other survey data.

With respect to the above description, it is to be realized that the optimum dimensional relationships for the parts of the invention, to include variations in size, materials, shape, form, function, manner of operation, assembly, and use are deemed readily apparent and obvious to one of ordinary skill in the art. The present invention encompasses all equivalent relationships to those illustrated in the drawings and described in the specification. The novel spirit of the present invention is still embodied by reordering or deleting some of the steps contained in this disclosure. The spirit of the invention is not meant to be limited in any way except by proper construction of the following claims.

What is claimed is:

1. A program product for storing in a data repository a plurality of evaluations from a plurality of users who evaluate a distributed content page using a content rating window, the program product comprising:
   a computer-usable medium;
   wherein the computer usable medium comprises instructions for a computer to perform steps comprising:
      accepting access by one of the plurality of users to the distributed content page;
      creating a user session;
      accepting a user evaluation of the distributed content page; and saving the user evaluation as a user rating in the data repository, wherein the user rating is cross-referenced with the user session and an external stimuli;
   wherein the content rating window is a graphical user interface that allows the user to rate the distributed content page;
   wherein the evaluations are stored with a version of the distributed content, a version of the content rating window, and the external stimuli presented to the users; and
   wherein the distributed content page is displayed on a portable electronic device.

2. The program product of claim 1 wherein the user session tracks the user's navigation of a plurality of the distributed content pages.

3. The program product of claim 2 wherein the content rating window is based on the characteristics of each user.

4. The program product of claim 3 wherein the evaluation program further performs steps comprising:
   determining whether the distributed content page is associated with the content rating window;
   responsive to the determination that the distributed content page is associated with the content rating window, giving the user the opportunity to evaluate the distributed content page;
   determining whether the user desires to evaluate the distributed content page; and
   responsive to the determination that the user desires to evaluate the distributed content page, displaying the content rating window.

5. The program product of claim 4 wherein the evaluation program further performs steps comprising:
   responsive to the determination that the distributed content page is not associated with the content rating window, determining whether the user has accessed a different distributed content page.

6. The program product of claim 5 wherein the evaluation program further performs steps comprising:
   responsive to the determination that the user does not desire to evaluate the distributed content page, determining whether the user has accessed the different distributed content page.

7. The program product of claim 6 wherein the evaluation program further performs steps comprising:
   responsive to the determination that the user has accessed the different distributed content page, repeating the steps in claim 6.

8. The program product of claim 7 wherein the evaluation program further performs steps comprising:

responsive to the determination that the user has not accessed the different distributed content page, closing the user session.

9. The program product of claim 8 wherein the user's personal information can be redacted from the data repository.

10. The program product of claim 1 wherein the user saves the user rating in a memory and completes the user rating at a later date.

11. The program product of claim 1 wherein the user rating may be categorized by any of the fields in the user session, the user rating, the version of the distributed content, the version of the content rating window, or the external stimuli.

12. The program product of claim 1 wherein the user completes the user rating by email, web browser, or telephone.

13. The program product of claim 1 wherein the user rating gathers evaluative information from the user based on the user's complete navigation of the plurality of the distributed content pages.

14. The program product of claim 1 wherein the user rating allows the user to evaluate the plurality of the distributed content pages.

15. The program product of claim 1 wherein the user reviews the distributed content page simultaneous with reviewing the content rating window.

16. The program product of claim 1 wherein distributed content administrator can distinguish between an accidental distributed content page request and an intentional distributed content page request by analyzing a duration data in the user session.

17. The program product of claim 1 wherein the distributed content page is a webpage.

18. An apparatus for storing in a data repository a plurality of evaluations from a plurality of users who evaluate a distributed content page using a content rating window, the apparatus comprising:
    means for accepting access by one of the plurality of users to the distributed content page;
    means for creating a user session;
    means for accepting a user evaluation of the distributed content page;
    means for saving the user evaluation as a user rating in the data repository, wherein the user rating is cross-referenced with the user session and the external stimuli;
    wherein the evaluations are stored with a version of the distributed content, a version of the content rating window, and an external stimuli presented to the users;
    wherein the user session tracks the user's navigation of a plurality of the distributed content pages;
    wherein the content rating window is based on the characteristics of each user;
    determining whether the distributed content page is associated with the content rating window;
    responsive to the determination that the distributed content page is associated with the content rating window, giving the user the opportunity to evaluate the distributed content page;
    determining whether the user desires to evaluate the distributed content page;
    responsive to the determination that the user desires to evaluate the distributed content page, displaying the content rating window;
    responsive to the determination that the distributed content page is not associated with the content rating window, determining whether the user has accessed a different distributed content page;
    responsive to the determination that the user does not desire to evaluate the distributed content page, determining whether the user has accessed the different distributed content page;
    responsive to the determination that the user has accessed the different distributed content page, determining whether the different distributed content page has a content rating window;
    responsive to the determination that the user has not accessed the different distributed content page, closing the user session;
    wherein the user's personal information can be redacted from the data repository;
    wherein the user saves the user rating in a memory and completes the user rating at a later date;
    wherein the user rating may be categorized by any of the fields in the user session, the user rating, the version of the distributed content, the version of the content rating window, or the external stimuli;
    wherein the user completes the user rating by email, web browser, or telephone;
    wherein the user rating gathers evaluative information from the user based on the user's complete navigation of the plurality of the distributed content pages;
    wherein the user rating allows the user to evaluate the plurality of the distributed content pages;
    wherein the user reviews the distributed content page simultaneous with reviewing the content rating window; and
    wherein distributed content administrator can distinguish between an accidental distributed content page request and an intentional distributed content page request by analyzing a duration data in the user session.

19. The apparatus of claim 18 wherein the distributed content page is a webpage.

20. The apparatus of claim 18 wherein the distributed content page is displayed on a portable electronic device.

* * * * *